J. Clackson,
Wood Clamp.
N° 24,194.    Patented May 31, 1859.
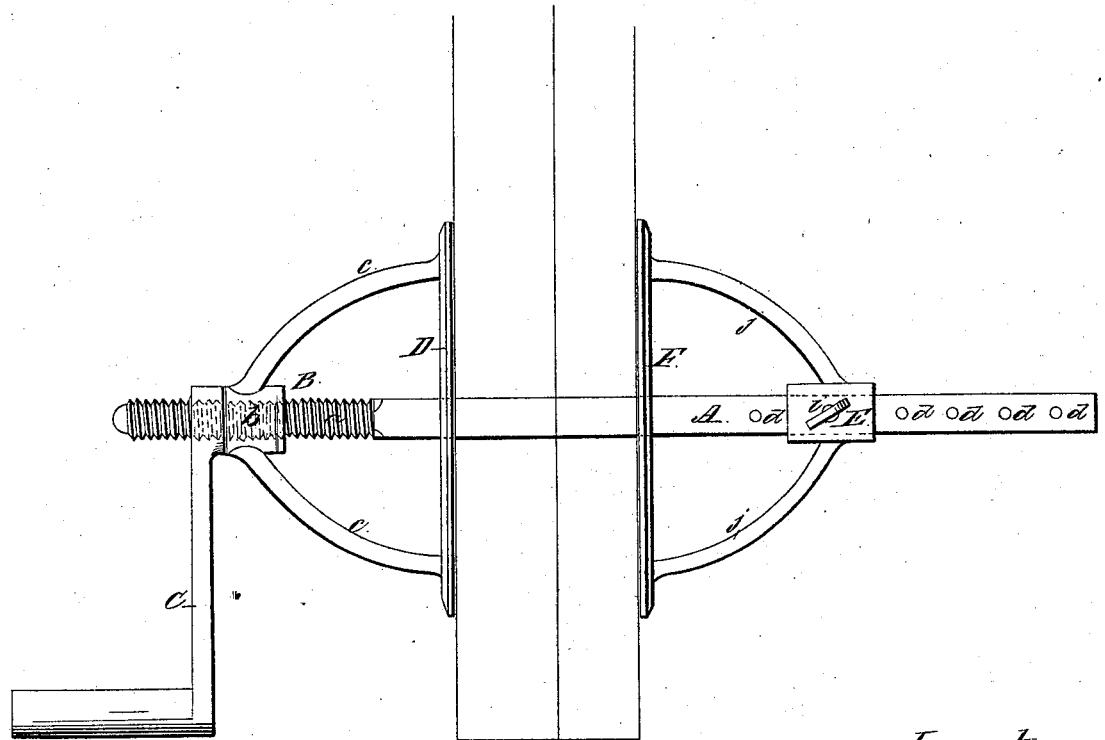
Witnesses:
J S Wallace
Mason Dimmick
Inventor:
John Clackson

UNITED STATES PATENT OFFICE.

JOHN CLACKSON, OF MILFORD, PENNSYLVANIA.

JOINER'S CLAMP.

Specification of Letters Patent No. 24,194, dated May 31, 1859.

*To all whom it may concern:*

Be it known that I, JOHN CLACKSON, of Milford, in the county of Pike and State of Pennsylvania, have invented a new and Improved Clamp for the Use of Joiners and other Artisans; and I do hereby declare that the following is a full, clear, and exact description of the same, reference being had to the annexed drawings, making a part of this specification, in which—

Figure 1, is a side view of my invention. Fig. 2, is a plan or top view of ditto.

Similar letters of reference indicate corresponding parts in the two figures.

The object of this invention is to obtain a clamp that will be perfectly stiff and firm, and one that may be more readily manipulated than those of usual construction. The clamps as hitherto constructed, when in use and screwed up tight, are very liable to bend the guide bar and are not, unless made very heavy and cumbersome, sufficiently stiff and firm. The within described invention consists in a peculiar manner of arranging the jaws on the guide bar as hereinafter fully shown and described, whereby the desired object is attained.

To enable those skilled in the art to fully understand and construct my invention I will proceed to describe it.

A, represents a guide bar which is of rectangular form and has a screw thread $a$, formed on one end of it. B, is a nut which is fitted on said screw thread $a$, said nut having a handle C, attached to it and a collar $b$, fitted loosely on it. To the collar $b$, two curved arms $c, c$, are attached at opposite sides and project outward from the collar at opposite sides of the bar A, and are attached to a jaw D, one near each end. The jaw D, is simply a rectangular plate fitted on bar A, said bar passing through the center of the plate. The bar A, near the end opposite to that on which the screw thread $a$, is formed has a series of holes $d$, made in it, and a collar E, is fitted and allowed to slide freely thereon. In the collar E, a screw $e$, is fitted which, when screwed into either of the holes $d$, secures the collar firmly on the bar A. From two opposite sides of the collar E, curved arms $j, j$, project, said arms being in the same plane as the arms $c, c$, and attached, one near each end of a jaw or plate F, through the center of which the bar A, passes. The arms $c, c$, $j, j$, are sufficiently long to admit of the collars $b$, E, being far enough from their respective plates or jaws to form a good bearing on the guide bar for the same, and in consequence of the jaws or plates extending from opposite sides of the bar, an equal bearing may be obtained on either side of it, that is to say, the stuff to be clamped, shown in red, may extend entirely across the guide bar as shown clearly in Fig. 2, and the bar A, will not be subjected to as great a strain as when the stuff is clamped on one side of it, for the arms $c, c, j, j$, transmit an equal pressure to the collars $b$, E, and to two opposite sides of the bar A, consequently a light strong bar A, may be employed. The implement may be used at either side, and the jaw or plate F, may be adjusted at any desired point on the bar A, by means of the screw $i$, fitting in either of the holes $d$, in the bar. The jaw or plate D, is moved or actuated by turning the crank C, and nut B.

Having thus described my invention what I claim as new and desire to secure by Letters Patent, is—

The clamp formed of the bar A, with the jaws D, F, constructed arranged and fitted on it substantially as described to form a new and improved article of manufacture.

JOHN CLACKSON.

Witnesses:
MASON DIMMICK,
I. S. WALLACE.